L. L. FERGUSON.
WHEEL.
APPLICATION FILED APR. 17, 1915.

1,188,637.

Patented June 27, 1916.

INVENTOR:
L. L. Ferguson,
BY
Chamberlin Freudenreich,
ATTORNEYS.

UNITED STATES PATENT OFFICE.

LEONARD L. FERGUSON, OF CHICAGO, ILLINOIS, ASSIGNOR TO THEODORE A. SHAW, OF CHICAGO, ILLINOIS.

WHEEL.

1,188,637.     Specification of Letters Patent.     Patented June 27, 1916.

Application filed April 17, 1915. Serial No. 21,971.

*To all whom it may concern:*

Be it known that I, LEONARD L. FERGUSON, a citizen of the United States, residing at Chicago, county of Cook, State of Illinois, have invented a certain new and useful Improvement in Wheels, and declare the following to be a full, clear, and exact description of the same, such as will enable others skilled in the art to which it pertains to make and use the same, reference being had to the accompanying drawings, which form a part of this specification.

It is the common practice to mount carpet sweepers on small rubber-tired wheels, and one of the great difficulties experienced has resulted from the apparent impossibility of fastening tires in place in a simple and convenient manner so as to insure that they will remain in place without requiring an expensive wheel construction or a tedious and costly fastening operation.

The present invention, specifically considered, relates to wheels of this kind, although it is applicable to other wheels, and has for its object to produce a simple and cheap wheel structure by means of which a tire of rubber or other suitable material will be securely held upon a wheel and at the same time be readily removed and replaced. A further object of my invention is to produce a simple, light, strong and attractive cushion-tired sheet metal wheel.

Figure 1:
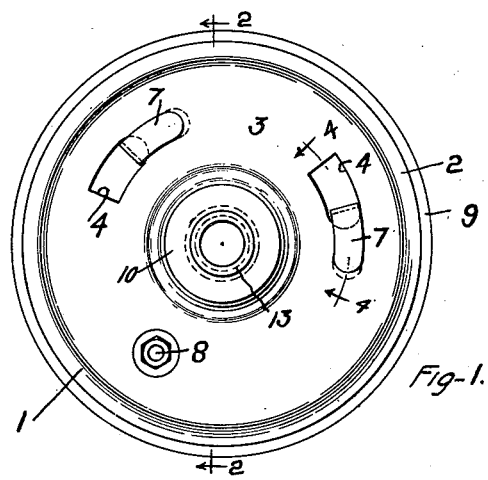
Figures 2, 4:
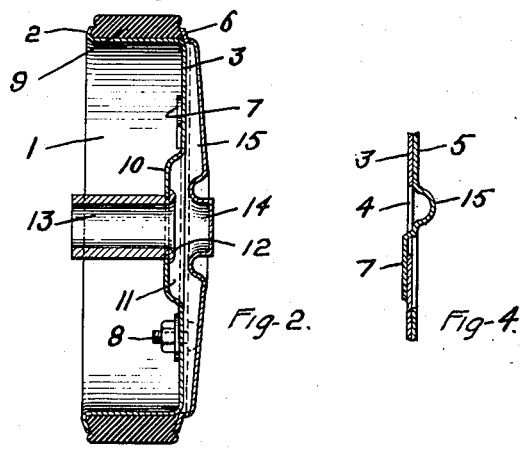
Figure 3:
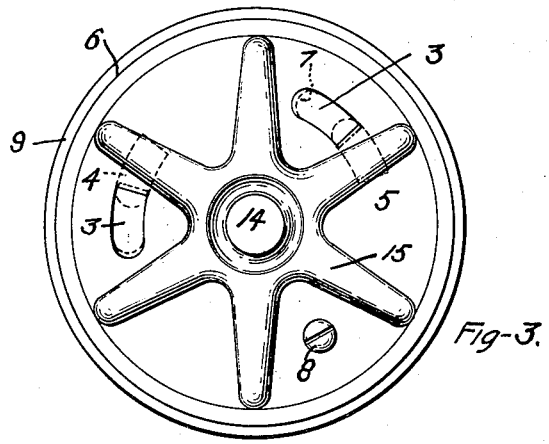

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation of a wheel arranged in accordance with a preferred form of my invention looking at the inner side thereof; Fig. 2 is a section on line 2—2 of Fig. 1; Fig. 3 is an elevation of the wheel as viewed from the outer side; and Fig. 4 is a section on line 4—4 of Fig. 1.

Referring to the drawing, 1 represents a cup-shaped member, preferably of sheet metal having at the mouth thereof an outwardly directed flange, 2, forming with the annular periphery of the member 1 an undercut groove. In the disk-like bottom portion, 3, of the member 1 are one or more openings, 4; there being two of these openings illustrated.

5 represents a plate or disk of approximately the same diameter as the member 3, having at the edge thereof an inclined flange, 6, similar to the flange 2, and so arranged that when the member 5 is laid against the member 3, the flange 6 forms with the cylindrical peripheral portion of the member 1 an undercut groove. The member 5 is provided with tongues, 7, struck up therefrom in locations corresponding to the openings 4 in the member 3 and bent laterally out of the plane of the member 5 so as to leave beneath the tongues a space equal to the thickness of the member 3; the tongues being shaped so that when the members 3 and 5 are laid together with the tongues registering with the openings 4, the tongues will pass through the openings and, upon turning the members 3 and 5 slightly relative to each other, they will be secured against relative axial displacement by reason of the fact that the tongues overlie the solid portions of the member 3 beside the openings 4. Each of the members 3 and 5 is provided with an additional opening so located that when the two members are interlocked, as heretofore explained, these openings register with each other and are adapted to receive a suitable fastening device, such as a small bolt, 8, passing through the same. When the bolt is in position, the members 3 and 5 are prevented from being turned backward and therefore locked firmly together in a rigid unitary structure.

The resilient tire, 9, is adapted to surround the annular cylindrical part of the body member of the wheel and to be gripped between the inclined flanges 2 and 6; the tire being made wide enough so that when the parts of the wheel are locked together they grip the tire firmly. It will be seen that with my improved arrangement the tire is held firmly in place so that it cannot come off accidentally, while at the same time by simply removing the detachable plate of the wheel, the tire may be slipped off and replaced by another which in turn will be locked upon the wheel when the detachable plate is placed in position as heretofore explained.

Where the wheel is made of sheet metal, I prefer to press the central portion of the bottom of the cup-shaped member 1 inwardly as indicated at 10 so as to provide on the outer side a recess, 11, to receive the flanged or riveted head, 12, of a suitable hub, 13, and thus avoid leaving a projection which would be in the way of the plate 5. Furthermore, the central portion of the plate 5 is preferably pressed outwardly as indicated at 14 so as to permit the end of the shaft or axle to project out beyond the plane of the plate 5 and at the same time be concealed. In order to stiffen the member 5 and at the same time give it an attractive appearance, I prefer to press the metal thereof outwardly along radial lines so as to form ribs or spokes, 15, radiating from the central hub-like portion 14.

While I have illustrated and described with particularity only a single preferred form of my invention I do not desire to be limited to the exact structural details thus illustrated and described but intend to cover all forms and arrangements which come within the terms employed in the definitions of my invention constituting the appended claims.

I claim:

1. A wheel comprising a cup-shaped body member, a plate member lying against the part forming the bottom of the cup, the latter part having an opening therethrough, a tongue on said plate adapted to project through said opening and interlock the plate and the body member against relative axial displacement upon turning them so as to bring them to a predetermined angle relative to each other, means for locking said plate and said body member against angular displacement when occupying said predetermined angular relation, a tire surrounding the cylindrical portion of the body member, and said body member and said plate having outwardly-projecting flanges engaging with the sides of the tire.

2. A wheel comprising a cup-shaped body member, a plate member lying against the part forming the bottom of the cup, the latter part having an opening therethrough, a tongue on said plate adapted to project through said opening and interlock the plate and the body member against relative axial displacement upon turning them so as to bring them to a predetermined angle relative to each other, said body member and said plate having bolt-receiving openings adapted to register with each other when said predetermined angular relation is obtained, means passing through said opening for locking the plate against angular displacement on the body member, a tire surrounding the cylindrical portion of the body member, and flanges on said body member and said plate gripping the tire between them.

3. A wheel comprising a sheet metal cup-shaped body member having an outwardly-projecting flange around the mouth thereof, a plate lying against the part forming the bottom of the cup and having a flange projecting beyond the sides of the cup, shoulders on said body member and said plate brought into locking engagement by a relative angular movement, means for locking said plate and said body member with said shoulders in interlocked relation, the central portion of the bottom of the cup being pressed inwardly, a hub lying within the cup and having a flanged head in the recess formed on the outer side of the cup by the inwardly pressed portion.

4. A wheel comprising a sheet metal cup-shaped body member having an outwardly-projecting flange around the mouth thereof, a plate lying against the part forming the bottom of the cup and having a flange projecting beyond the sides of the cup, shoulders on said body member and said plate brought into locking engagement by a relative angular movement, means for locking said plate and said body member with said shoulders in interlocked relation, the central portion of the bottom of the cup being pressed inwardly, a hub lying within the cup and having a flanged head in the recess formed on the outer side of the cup by the inwardly pressed portion, said plate having an outwardly pressed portion at the center in proximity to the end of the hub.

5. A wheel comprising a sheet metal cup-shaped body member having an outwardly-projecting flange around the mouth thereof, a plate lying against the part forming the bottom of the cup and having a flange projecting beyond the sides of the cup, shoulders on said body member and said plate brought into locking engagement by a relative angular movement, means for locking said plate and said body member with said shoulders in interlocked relation, the central portion of the bottom of the cup being pressed inwardly, a hub lying within the cup and having a flanged head in the recess formed on the outer side of the cup by the inwardly pressed portion, said plate having an outwardly pressed portion at the center in proximity to the end of the hub and having also outwardly pressed radial arms or spokes.

6. A wheel comprising a cup-shaped body member having an outwardly-projecting flange around the mouth thereof, a hub secured to said body member at the center of the member forming the bottom of the cup, a plate lying beside said body member and concealing said hub, said plate having a portion projecting outwardly beyond the cylindrical portion of the body member to form a flange coöperating with the aforesaid flange to grasp a tire, and means for securing said plate to said body member.

7. A wheel comprising a cup-shaped body member having an outwardly-projecting flange around the mouth thereof, a hub secured to said body member at the center of the member forming the bottom of the cup, a plate lying beside said body member and concealing said hub, said plate having a portion projecting outwardly beyond the cylindrical portion of the body member to form a flange coöperating with the aforesaid flange to grasp a tire, said body member and said plate having shoulders interlocked by relative movement angularly of the axis of the wheel and acting to prevent relative axial displacement between the body member and the plate, and means for securing said body member and said plate against relative angular movement.

In testimony whereof, I sign this specification.

LEONARD L. FERGUSON.